US008955851B2

(12) United States Patent
Matsumoto et al.

(10) Patent No.: US 8,955,851 B2
(45) Date of Patent: Feb. 17, 2015

(54) METAL ANNULAR GASKET (76) Inventors: Kenji Matsumoto, Okayama (JP);
Kazuhiro Takahashi, Okayama (JP)

(*) Notice: Subject to any disclaimer, the term of this patent is extended or adjusted under 35 U.S.C. 154(b) by 1344 days.

(21) Appl. No.: 12/312,668

(22) PCT Filed: Nov. 5, 2007

(86) PCT No.: PCT/JP2007/071464
§ 371 (c)(1),
(2), (4) Date: Jan. 25, 2010

(87) PCT Pub. No.: WO2008/065857
PCT Pub. Date: Jun. 5, 2008

(65) Prior Publication Data
US 2010/0143076 A1    Jun. 10, 2010

(30) Foreign Application Priority Data
Nov. 27, 2006   (JP) ................ P2006-317990

(51) Int. Cl.
*F16J 15/10* (2006.01)
*F16B 43/00* (2006.01)
*F16B 41/00* (2006.01)

(52) U.S. Cl.
CPC ............ *F16B 43/001* (2013.01); *F16J 15/104*
(2013.01); *F16B 41/002* (2013.01); *Y10S 277/937* (2013.01)
USPC .......................................... 277/651; 277/937

(58) Field of Classification Search
CPC ............ F16J 2015/0856; F16J 15/0825; F16J 15/122; F16J 2015/085; F16J 15/123; F16J 15/064; F16J 15/0806; F16J 15/102; F16J 15/104; F16J 15/061; F16J 15/027; F16J 15/022; F16J 15/0887; F16J 15/3284; F16J 15/32; F16J 15/20; F16J 15/22; F16J 9/26; F16J 15/166; C09K 3/10; C09K 3/1028; B32B 27/04; B63B 19/26; B29B 99/0053; H05K 9/0015; B61F 15/22; F16C 33/74; F16B 43/001; F16B 33/004; F16B 43/00; F16B 35/048; F16B 37/00; F16B 35/06; F16B 41/002; F16B 37/14; F16B 33/006; F16B 19/04; F16B 33/06; F16B 33/008; F16B 15/0092; E04D 3/3603; E04F 13/0835; E04B 1/7633; B29D 1/005; B29K 2105/101; B29C 53/585; C23C 28/00; C23C 28/023
USPC ................ 277/592, 650–652, 654, 935–939; 411/369, 371.1, 533, 542, 901–903; 106/638, 711; 428/66.4
See application file for complete search history.

(56) References Cited

U.S. PATENT DOCUMENTS 524,162 A * 8/1894 Cochrane ...................... 277/654
2,116,000 A * 5/1938 Peterson ....................... 428/444
(Continued)

FOREIGN PATENT DOCUMENTS

JP    41405/1983    10/1984
JP    199591/1987    7/1989
(Continued)

*Primary Examiner* — Gay Ann Spahn
(74) *Attorney, Agent, or Firm* — Bacon & Thomas, PLLC (57) ABSTRACT A metal annular gasket comprising an annular metal base plate; a compound layer integrally laminated on both surfaces of the annular metal base plate, the compound layer being made of synthetic resin or a rubber material mixed with a fiber material; and an annular seal layer having a circumferential covering portion which covers the inner circumferential edge of the annular metal plate and the inner circumferential edge of both compound layers, the compound layer being made of synthetic resin or a rubber material. The annular seal layer is formed such that the surface of the annular seal layer is so connected to the surfaces of the compound layer as to provide smooth transition in its thickness direction.

4 Claims, 6 Drawing Sheets

(56) References Cited

U.S. PATENT DOCUMENTS

| | | | |
|---|---|---|---|
| 2,136,734 A * | 11/1938 | Denman | 428/133 |
| 2,439,516 A * | 4/1948 | Holcomb | 174/159 |
| 3,726,178 A * | 4/1973 | Dimitry | 411/371.1 |
| 4,049,856 A * | 9/1977 | Adams | 428/131 |
| 4,292,876 A * | 10/1981 | De Graan | 411/542 |
| 4,621,961 A * | 11/1986 | Gulistan | 411/352 |
| 4,702,657 A * | 10/1987 | Jelinek | 411/369 |
| 4,732,519 A * | 3/1988 | Wagner | 411/337 |
| 4,887,951 A * | 12/1989 | Hashimoto | 411/371.1 |
| 5,011,162 A * | 4/1991 | Jelinek | 277/644 |
| 5,128,209 A * | 7/1992 | Sakai et al. | 428/421 |
| 5,188,495 A * | 2/1993 | Jones, Jr. | 411/369 |
| 5,193,960 A * | 3/1993 | Fukushima et al. | 411/542 |
| 5,409,337 A * | 4/1995 | Muyskens et al. | 411/148 |
| 5,615,897 A * | 4/1997 | Akita | 277/654 |
| 5,634,645 A * | 6/1997 | Seki et al. | 277/608 |
| 5,649,798 A * | 7/1997 | Ito | 411/369 |
| 5,722,670 A * | 3/1998 | Novak et al. | 277/591 |
| 5,906,463 A * | 5/1999 | Damm et al. | 411/369 |
| 5,958,571 A * | 9/1999 | Omura | 428/316.6 |
| 6,626,439 B1 * | 9/2003 | Forry et al. | 277/592 |
| 6,979,162 B2 * | 12/2005 | Kato | 411/371.1 |
| 7,059,612 B2 * | 6/2006 | Kuribayashi | 277/637 |
| 7,097,177 B2 * | 8/2006 | Kasuya | 277/592 |
| 2003/0230856 A1 * | 12/2003 | Forry et al. | 277/592 |
| 2005/0062234 A1 * | 3/2005 | Kuribayashi | 277/602 |
| 2006/0239797 A1 * | 10/2006 | Evanbar | 411/542 |
| 2010/0068004 A1 * | 3/2010 | Mair | 411/542 |

FOREIGN PATENT DOCUMENTS

| | | |
|---|---|---|
| JP | 17255/1989 | 8/1990 |
| JP | 5-79566 A | 3/1993 |
| JP | 6-82424 | 11/1994 |
| JP | 7-32218 | 6/1995 |

* cited by examiner

METAL ANNULAR GASKET

TECHNICAL FIELD

The present invention relates to a metal annular gasket designed to be attached to the neck portion of a bolt and a stud bolt for fitting covers, a male screw for fitting sensors such as a pressure sensor or a temperature sensor.

BACKGROUND ART

Conventionally, bolts are arranged at appropriate portions of a covering member and a tightening means is executed while interposing a gasket attached around the covering member between the mounting portion and the bolt, thereby enabling to attach and fix the covering member such as the rocker cover and the oil pan of the engine to the mounting portion. Washer seal (metal annular gasket) having elasticity is interposed between the tightening means and the covering member in order to achieve sealing around the tightening means and sound and vibration control of the covering member. When the sensors like a pressure sensor and a temperature sensor are fitted on a mounting portion, a similar washer seal is interposed between a fitting male screw and a sensor housing in order to achieve vibration control of the sensors.

Such a washer seal is sometimes conveyed and transported while the neck portion of bolt and male screw (generically referred to tightening means hereinafter) is preliminary inserted into the inner hole (hole of tightening means). In such a case, if the tightening means is simply inserted into the inner hole of the washer seal, it sometimes falls down during conveyance and transportation, so that a rib is formed in the inner hole or a caulking deformation process is executed for the inner hole in order to prevent dropout. However, such a dropout prevention process requires an extra process during production of a washer seal, and sometimes damages the neck portion and screw portion of the tightening means. The Patent Document 1 and the Patent Document 2 disclose a washer seal (seal metal washer) wherein an inner hole to be inserted by the tightening means has a sealing portion made of rubber or synthetic resin so as to be elastically held with the inserted tightening means.

Patent Document 1 Japanese Utility Model Publication 6-82424-U1

Patent Document 2 Japanese Utility Model Publication 7-32218-U1

DISCLOSURE OF INVENTION

Problems to be Solved in the Invention

According to the washer seal disclosed in the patent document 1, a plurality of core materials (metal ring or metal ring with compound layer) are laminated and a seal member with flange is integrally provided in the circumferential portion so as to elastically restraining the core materials. It has a superior sealing ability and a large tightening load, therefore it is preferably used for attaching and fixing the above-mentioned covering material. However, the greater part of the tightening load is applied on the flange portion of the seal member with flange, thereby causing a large fatigue on it to accelerate deterioration with age. Further, because a plurality of core members are laminated and integrated, its large thickness requires a long neck portion for an objective tightening means.

On the other hand, according to the seal metal washer disclosed in the patent document 2, an annular rubber with large thickness is fitted at the inner portion of the metal washer body, an adjustment metal fitting is abutted to the lower surface of the metal washer body and the outer circumferential surface of the rubber, and the thickness of the adjustment metal fitting is designed to be adjusted according to the size of the fitting hole. Also in this case, the greater part of the tightening load is applied on the annular rubber and it is predicted that a large fatigue is caused on it to accelerate deterioration with age.

The present invention is proposed in view of the above-mentioned problems and its object is to provide a metal annular gasket having a superior sealing ability, an excellent sound and vibration insulation property, a high durability and a superior carrying capacity.

Means to Solve the Problems

The metal annular gasket of the present invention comprises an annular metal base plate; a compound layer integrally laminated on both surfaces of the annular metal base plate, the compound layer being made of synthetic resin or a rubber material mixed with a fiber material; and an annular seal layer having a circumferential covering portion which covers the inner circumferential edge of the annular metal plate and the inner circumferential edge of both compound layers, the compound layer being made of synthetic resin or a rubber material. The annular seal layer is formed such that the surface of the annular seal layer is so connected to the surfaces of the compound layer as to provide smooth transition in its thickness direction.

In the present invention, the compound layers may have a compressed flat layer portion with an fixed thickness whose inner surfaces are compressed in their thickness direction, whereas the annular seal layer may have a covering layer portion which extends from the circumferential covering portion and is integrally formed on the surface of the compressed flat layer portion in a manner that the surfaces of the covering layer portion is connected to the surface of the compound layer except for the compressed flat layer portion for providing smooth transition in their thickness direction. Otherwise, the circumferential covering portion and the inner circumferential edges of the both compound layers may be integrally connected each other in a manner that the synthetic resin or a rubber material constituting the annular seal layer partially penetrates into the fiber material constituting the compound layer in their boundary portion.

Further according to the present invention, a ring-like salient projecting toward the centrifugal direction of the annular seal layer may be further provided along the inner circumferential faces of the circumferential covering portion. Still further, an annular bead portion with chevron shape may be concentrically provided in its thickness side direction on the surface of the annular seal layer.

Effect of the Invention

The metal annular gasket of the present invention has rigidity by the annular metal base plate. Further, the compound layer integrally laminated on the both surfaces of the annular metal base plate is formed by mixing a fiber material in synthetic resin or a rubber material, so the synthetic resin or the rubber material is carried by the fiber material to give toughness. In addition, when two members are fastened by inserting the tightening means such as bolts in the inner hole, the synthetic resin or the rubber material does not drift by the carried force, thereby keeping the gasket function. The circumferential covering portion constituting the annular seal layer made of synthetic resin or a rubber material is designed to cover the inner circumferential edge of the annular metal plate and the inner circumferential edge of the both compound layers, so that the tightening means can be elastically engaged into the circumferential covering portion when the tightening means is inserted in the inner hole, thereby preventing dropout of the gasket during conveyance and transportation and its damage. Further, the surface in the thickness direction of the annular seal layer is formed same as the surface of the compound layer, and the tightening load is applied on the annular seal layer and the compound layer, so that fatigue of the annular seal layer because of the concentrated load is not caused and the durability is improved. The compressed annular seal layer and compound layer are interposed in the fastened portion to give sound and vibration insulation property, thereby improving applicability for attaching and fixing the cover member such as the rocker cover and the oil pan of the engine and for fitting sensors such as a pressure sensor and a temperature sensor.

When the portion around the inner circumference of each compound layers is compressed into the thickness direction with a constant width to form the compressed flat layer portion and the covering layer portion as one part of the annular seal layer is integrally attached on the surface of the compressed flat layer portion, the covering layer portion is compressed together with the compound layer in case of fastening because the covering layer portion is made of synthetic resin or a rubber material, thereby obtaining a superior sealing ability of the fastened portion by the contact pressure. Further, the surface of the covering layer portion is designed to be same as the surface of the compound layer except for the compressed flat layer portion, so that the fastening load is applied on the covering layer portion and the compressed flat layer portion as a part of the compound layer, thereby preventing fatigue of the annular seal layer including the covering layer portion caused by the concentrated load and improving the durability.

At the boundary portion of the circumferential covering portion and the inner circumferential edge of the both compound layers, when a part of the synthetic resin or the rubber material constituting the annular seal layer penetrates between the fiber material constituting the compound layer to be integrally fixed each other, in addition to the above-mentioned effects, the circumferential covering portion can be easily formed and it, namely the annular seal layer and the compound layer, is strongly integrated.

When a ring-like salient projecting into the centrifugal direction is formed along the circumferential direction in the inner circumferential face of the circumferential covering portion, prevention effect of dropout and damage on the fastening means can become remarkable by the elastic holding action of the ring-like salient.

Further, a chevron shaped annular bead portion is concentrically formed on the surface in the thickness direction side of the annular seal layer, the bead portion is compressed during fastening and superior sealing ability can be obtained by the strong contact pressure by the reaction force.

EXPLANATION OF REFERENCE NUMERAL 1 annular metal base plate
2 compound layer
2a compressed flat layer portion
3 annular seal layer
3a circumferential covering portion
3b covering layer portion
3c ring-like salient
3d bead portion
A, B, C, D, E metal annular gasket

BEST MODE FOR CARRYING OUT THE INVENTION

Figure 1:
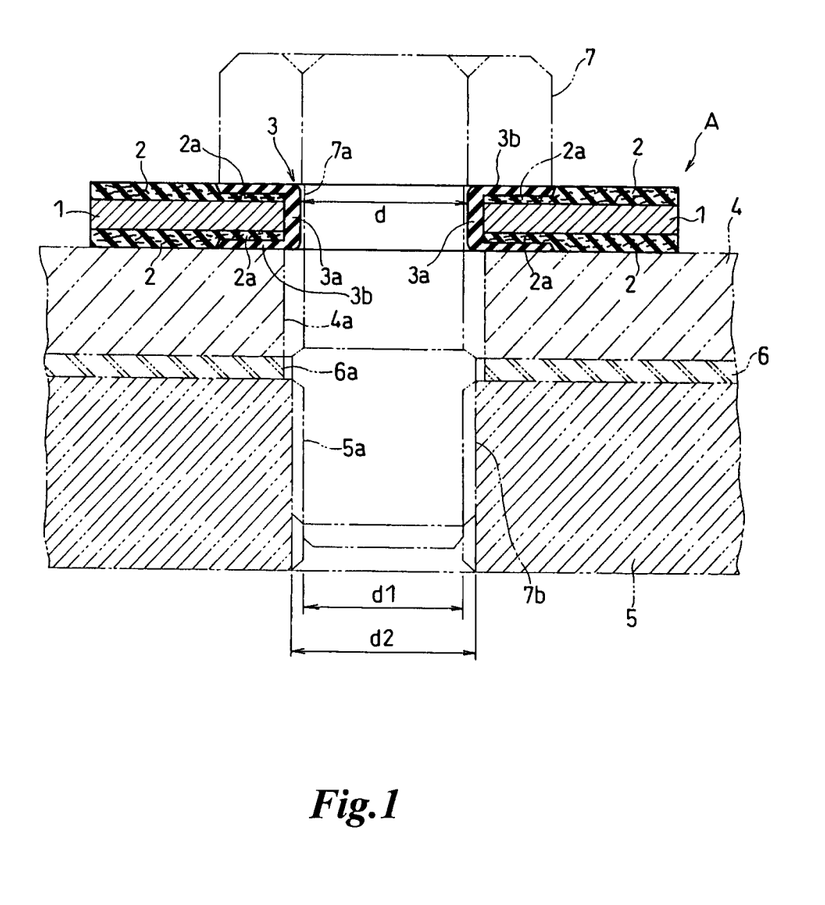
FIG. 1 is a sectional view showing an embodiment of the metal annular gasket of the present invention.
Figure 5A:
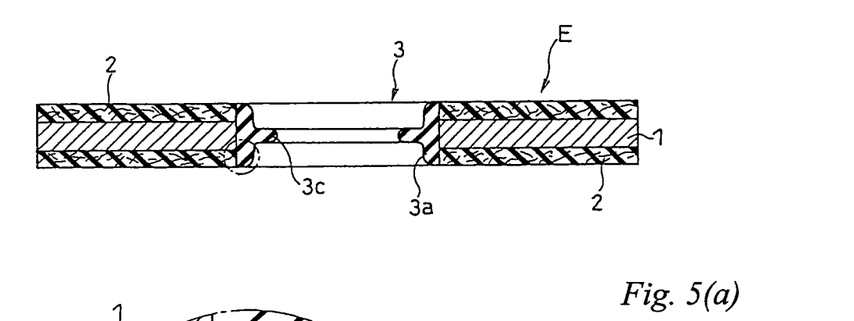
FIG. 5(a) is a sectional view of other embodiment and FIG. 5(b) is a detailed view taken from FIG. 5(a).
Figure 5B:
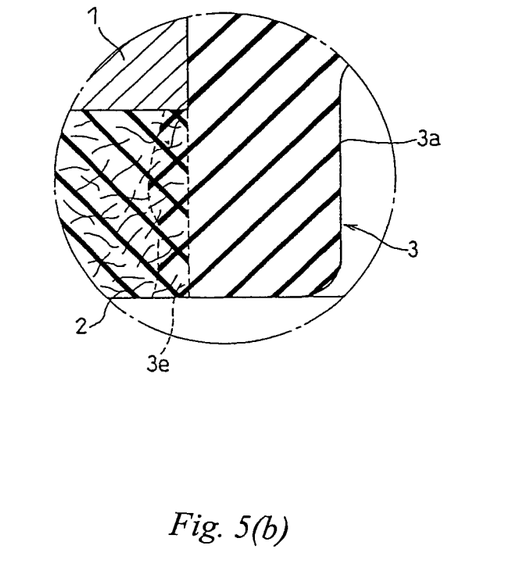
Figure 6:
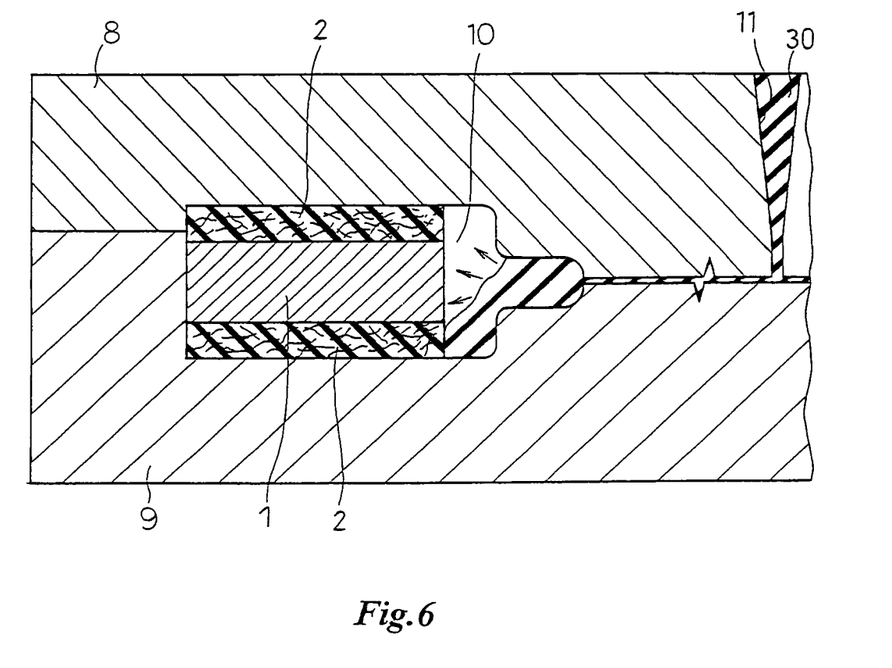
FIG. 6 is an explanatory view showing how the metal annular gasket of the embodiment in FIGS. 5(a) and 5(b) is manufactured.

The best mode for carrying out the present invention is explained hereinafter based on the drawings. FIG. 1 is a sectional view showing an embodiment of the metal annular gasket of the present invention. FIGS. 2-5 show a sectional view of other embodiments, respectively. FIG. 6 is an explanatory view showing how the metal annular gasket of the embodiment in FIGS. 5(a) and 5(b) is manufactured.

According to the metal annular gasket A in FIG. 1, a compound layer 2, 2 is formed on both surfaces of an annular metal base plate 1 made of steel sheet like an aluminum plate and a stainless steel sheet. The compound layer 2 is formed by laminating a compound material in which an organic or inorganic fiber material and additive (rubber agent, filler and the like) are mixed with synthetic resin or a rubber material. The compound material in the figure is formed by mixing a fiber material with a rubber material, thus formed compound material is imprinted on the metal plate with a roll via adhesive to be rendered to vulcanized adhesion in an oven, thereby the compound layer 2 is integrally laminated on both surfaces of the metal plate and a gasket sheet is obtained. Otherwise, the compound material is formed in a form of sheet in advance and thus obtained sheet is laminated on both surfaces of the metal plate, thereby obtaining the gasket sheet. Then, the gasket sheet is punched to obtain a desirable shape of metal annular gasket. Before such punching or after punching the portion around the inner circumference of the both compound layers 2 is compressed to form a step-like compressed flat layer portion 2a which is compressed into the thickness direction with a fixed width.

The inner hole portion of the laminated body comprising the annular metal base plate 1 and the compound layers 2, 2 is provided with a circumferential covering portion 3a which covers the inner circumferential edges of the annular metal base plate 1 and the compound layer 2 (compressed flat layer portion 2a). Further, the covering layer portions 3b, 3b integrally attached on the surfaces of the compressed flat layer portions 2a, 2a are extended from the circumferential covering portion 3a. The circumferential covering portion 3a and the covering layer portions 3b, 3b constitute an annular seal layer 3, which is formed by molding synthetic resin or a rubber material (rubber material is used in the figure). The annular seal layer 3 is formed such that the annular metal base plate 1 which is integrally attached with the compound layer 2 formed with the compressed flat layer portion 2a is placed in a mold prepared in advance and synthetic resin or a rubber material is filled in the cavity to be integrally formed. The cavity in which synthetic resin or a rubber material is injected is formed in such a manner that the surface of the covering layer portion 3b as a part of the annular seal layer 3 becomes the same surface as that of the compound layer 2 except for the compressed flat layer portion 2a. The covering layer portion 3b and the compound layer 2 are connected so as not to form any dump or step on their surfaces.

The fiber materials to be mixed in the compound material are a compressible inorganic fiber other than asbestos or a compressible organic fiber. For example, the compressible inorganic fiber other than asbestos may be glass fiber; ceramic fiber; rock wool; mineral wool; fused quartz fiber; chemical processed high silica fiber; fused alumina silicate fiber; alumina continuous fiber; stabilized zirconia fiber; boron nitride fiber; alkali titanate fiber; whiskers; boron fiber; carbon fiber; metal fiber; or the like. The organic fiber may be aromatic polyamide fibers; other polyamide fibers; polyolefine fibers; polyester fibers; polyacrylonitrile fibers; polyvinyl alcohol fibers; polyvinylchloride fibers; polyurea fibers; polyurethane fibers; polyfluorocarbon fibers; phenol fibers; cellulosic fibers; or the like.

The rubber material constituting the compound layer or the annular seal layer may include NBR, styrene-butadiene rubber (SBR); isoprene rubber (IR); chloroprene rubber (CR); butadiene rubber (BR); isobutylene-isoprene rubber (IIR); ethylene propylene rubber (EPM); fluoro rubber (FKM); silicone rubber (VMQ); chlorosulfonated polyethylene (CSM); ethylene-vinylacetate copolymer (EVA); chlorinated polyethylene (CPE); chloro-isobutene-isoprene rubber (CIR); epichlorohydrin rubber (ECO); nitrile isoprene rubber (NIR); natural rubber (NR); or the like. The synthetic resin constituting the compound layer or the annular seal layer may be phenolic resin, urea resin, melamine formaldehyde resin, epoxy resin, alkyd resin, unsaturated polyester resin, diallyl phthalate resin, silicon resin or the like. Further, a mixture of the above-mentioned rubber material and these resin materials may be used.

FIG. 1 shows a cover member (for example, rocker cover or oil pan of engine) 4 is attached and fixed to an objective member to be mounted (for example, cylinder head or cylinder block of engine) 5 with a bolt 7 via a gasket 6. The bolt 7 is inserted into the inner hole (hole of fastening means) of the metal annular gasket A before fastening operation. The diameter "d" of the inner hole formed with the inner circumferential face of the circumferential covering portion 3a of the metal annular gasket A is designed to be larger than the outer diameter d1 of the neck portion 7a of the bolt 7 and be smaller than the outer diameter d2 of the male screw portion Therefore, before attaching and assembling the cover member 4, the male screw portion 7b is inserted in the inner hole of the metal annular gasket A while accompanying elastic deformation of the circumferential covering portion 3a and the metal annular gasket A can be engaged and held with the neck portion 7a by the elastic restoration. When the metal annular gasket A under such condition is brought into an assembling line together with the bolt 7, both of them cannot be departed and dropped during its conveyance and transportation. The circumferential covering portion 3a is made of synthetic resin or a rubber material, so that the neck portion 7a and the male screw portion 7b of the bolt 7 are not damaged during insertion, or conveyance and transportation.

The male screw portion 7b of the bolt 7 is inserted into through holes 4a, 6a of the cover member 4 and the gasket 6 and is screwed and fastened into a female screw portion 5a of the objective member to be mounted 5 while the metal annular gasket A is engaged and held under the above-mentioned condition. This achieves fastening and integration of the objective member to be mounted 5 and the cover member 4 via the gasket. The annular seal layer 3 is compressed with the compound layer 2 (compressed flat layer portion 2a) by the fastening and the contact pressure secures sealing of the fastened portion with the bolt 7. The surface of the covering layer portion 3b of the annular seal layer 3 is designed to be the same surface of the compound layer 2 except for the compressed flat layer portion 2a, so that fastening load is applied on the covering layer portion 3b and the compound layer 2 at the boundary face to the cover member 4 and fatigue of the annular seal layer 3 by a concentric load is not caused, thereby improving durability. Further, the compressed covering layer portion 3b and compound layer 2 are interposed in the fastening portion and superior sound and vibration insulation property can be obtained.

Figure 2:
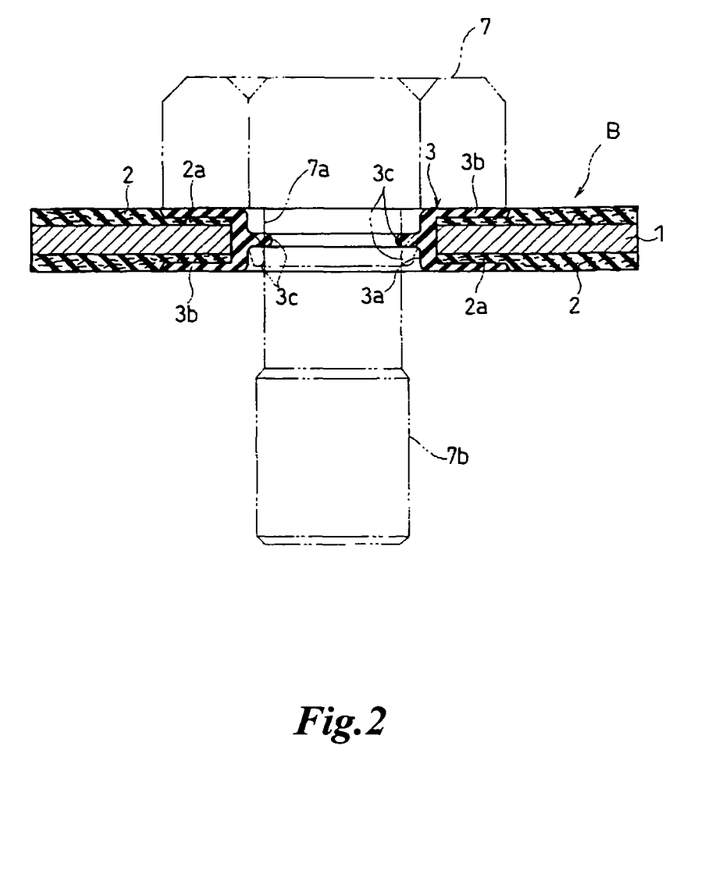
FIG. 2 is a sectional view of other embodiment.

FIG. 2 shows other embodiment. The metal annular gasket B in this embodiment is different from the metal annular gasket A of the above-mentioned first embodiment in that a ring like salient 3c projecting in the centrifugal direction is formed along the circumferential direction on the inner circumferential face of the circumferential covering portion 3a. In this embodiment, the prevention effect of dropout and damage on the bolt 7 can become more remarkable by the holding action of the ring-like salient 3 accompanied with elastic deformation when the bolt 7 is inserted into the inner hole of the metal annular gasket B. Specifically, if the bolt 7 is thinner than that shown in FIG. 1 as shown in FIG. 2, the holding action by the restoration resilience can be appeared accompanied with the elastic deformation of the ring-like salient 3c (see deformed condition shown with two-dotted lines in FIG. 2). Accordingly, the applicable scope is increased for several kinds of bolt. The other structures are the same as those in the above-mentioned embodiment, so the common members have the same reference numerals and their explanations are omitted here.

Figure 3:
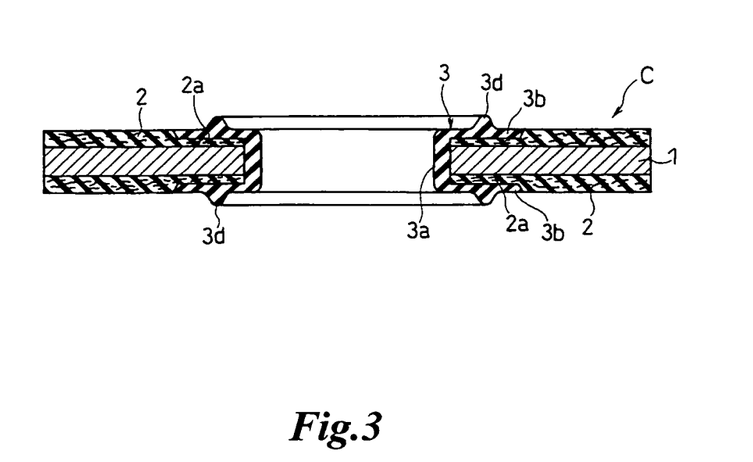
FIG. 3 is a sectional view of other embodiment.

FIG. 3 further shows other embodiment. The metal annular gasket C is different from the metal annular gasket A of the first embodiment in that a chevron shaped annular bead portion 3d is concentrically formed on the surface (surface of the covering layer portion 3b) in the thickness direction side of the annular seal layer 3. In this embodiment, the upper and lower bead portions 3d are compressed to be attached firmly to the upper and lower members (the head portion of the bolt 7 and the cover member 4) when being fastened with the bolt 7, achieving stronger sealing ability by the large surface pressure by the reaction force. The other structures are the same as those in the above-mentioned embodiment, so the common members have the same reference numerals and their explanations are also omitted here.

Figure 4:
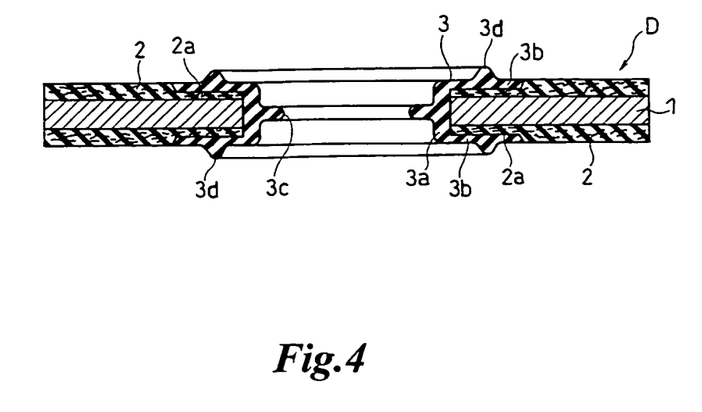
FIG. 4 is a sectional view of other embodiment.

FIG. 4 still further shows other embodiment. The metal annular gasket D in this embodiment is different from the gasket A of the first embodiment in that the ring-like salient 3c projecting in the centrifugal direction is formed along the circumferential direction on the inner circumferential face of the circumferential covering portion 3a and the chevron shaped annular bead portion 3d is concentrically formed on the surface (surface of the covering layer portion 3b) in the thickness direction side of the annular seal layer 3. The metal annular gasket D of this embodiment has the combination effect of the gasket B of the second embodiment and the gasket C of the third embodiment and its applicability is improved for attaching and fixing a covering member such as the rocker cover and oil pan of the engine or for fitting several kinds of sensors like a pressure sensor and a temperature sensor. The other structures are the same as those in the above-mentioned embodiment, so the common members have the same reference numerals and their explanations are also omitted here.

FIGS. 5(a) and 5(b) further shows other embodiment. The metal annular gasket E in this embodiment does not have the compressed flat layer portion 2a of the compound layer 2 and the covering layer portion 3b of the annular seal layer 3 shown in the above-mentioned embodiments and the annular seal layer 3 is constituted only with the circumferential covering portion 3a which covers the inner circumferential edge of the annular metal base plate 1 and the inner circumferential edges of both compound layers 2, 2. The figure shows the ring-like salient 3c projecting in the centrifugal direction is formed along the circumferential direction on the inner circumferential face of the circumferential covering portion 3a. However, the ring-like salient 3c may not be provided like the embodiment in FIG. 1, the chevron shaped annular bead portion 3d may be concentrically formed on the surface in the thickness direction side of the annular seal layer 3 like the embodiment in FIG. 3, or both of the ring-like salient 3c and the annular bead portion 3d may be provided like the embodiment in FIG. 4.

According to the metal annular gasket E in this embodiment, at the boundary portion of the circumferential covering portion 3a and the inner circumferential edges of the both compound layers 2, 2, a part of rubber material (synthetic resin material) constituting the annular seal layer 3 penetrates into the fiber material constituting the compound layers 2, 2 to integrally fix the annular seal layer 3 and the compound layers 2, 2 as shown in the enlarged portion in FIG. 5(b). The compound layer 2 is formed in such a manner that the fiber material is tangled each other using the rubber material (synthetic resin material) as binder and a porous layer structure is formed having a plurality of vacancies between the fibers in its thickness. As mentioned later, a part of rubber material (synthetic resin material) is penetrated into the vacancy while the annular seal layer 3 is formed, and the annular seal layer 3 and the compound layers 2, 2 are fixed and integrated each other by the anchor effect of the penetrated portion 3e of the rubber material.

The production procedure of the metal annular gasket E is explained referring to FIG. 6. FIG. 6 shows an injection procedure of an unvulcanized rubber material 30 for forming the annular seal layer 3. The metal mold (upper mold 4 and the lower mold 5) formed with a cavity 6 of predetermined shape is prepared and a laminated body which is formed by laminating the compound layer 2, 2 on both surfaces of the annular metal base plate 1 as mentioned above is disposed in the cavity 6. Then, the upper mold 4 and the lower mold 5 are assembled, the unvulcanized rubber material 30 is injected from the inlet 7 and is filled in the residual space in the cavity 6, and the rubber material 30 is vulcanized and molded. When injecting and filling the rubber material 30, a part of the rubber material 30 penetrates into the residual space from the inner circumferential edge of the compound layer 2, and the penetrated rubber material 30 becomes hardened by the vulcanization molding as shown in broken lines in FIG. 5(b) to form the penetrated portion 3e. Thus, the annular seal layer 3 and the compound layers 2, 2 are fixed and integrated by such a penetrated portion 3e, easily obtaining the metal annular gasket E having the same functions as those metal annular gaskets A-D shown in FIGS. 1-5, respectively.

The metal annular gasket of the present invention is used for attaching to the covering member in the above explanation, however, the present invention is not limited to such embodiment and the metal annular gasket of the present invention can be used for fitting several kinds of sensors with male screws. Further, it is possible that a graphite coating layer may be formed on the surface of the compound layer 2 or the annular seal layer 3 or a silicon rein coating layer may be formed as an adherence prevention membrane. Still further, the entire shape of the metal annular gasket of the present invention is not limited to be circular and it may be formed such that a part of the circumference is liner in order to prevent rotation or may be formed polygonal annular body.

The invention claimed is:

1. A metal annular gasket, comprising:
an annular metal base plate having a hole portion;
a compound layer integrally laminated on both upper and lower surfaces of said annular metal base plate, said compound layers being made of synthetic resin or a rubber material mixed with a fiber material;
an annular seal layer made of one of: a synthetic resin and a rubber material, having a circumferential covering portion which is attached to the inner circumferential edge of said annular metal plate and the inner circumferential edge of both upper and lower compound layers, said circumferential covering portion defining an inner hole into which a tightening means is inserted,
said tightening means for insertion into an inner hole formed by said circumferential covering portion, said tightening means having a head portion, a neck portion extending from said head portion with a smaller outer diameter than that of said head portion, and a screw portion extending from said neck portion, wherein:
said annular seal layer is formed such that the upper and lower surfaces of said annular seal layer are so connected to the upper surface of said upper compound layer and the lower surface of said lower compound layer, respectively as to provide a smooth transition in a thickness direction of said annular seal layer;
an annular salient projecting radially inward from said annular seal layer is further provided along an inner circumferential face of said circumferential covering portion, a thickness of said annular salient being smaller than a thickness of said circumferential covering portion;
a diameter of said inner hole is formed so as to be larger than an outer diameter of said neck portion of said tightening means whereas a diameter formed by said annular salient is formed so as to be smaller than said outer diameter of said neck portion of said tightening means; and
said annular salient has a uniform thickness and is so formed as to hold said neck portion of said tightening means in its outer circumference by the restoration resilience of said annular salient caused when said neck portion of said tightening means is inserted into said inner hole,
said fiber material containing a rock wool and a polyamide fiber, and said circumferential covering portion being attached to the inner circumferential edge of said compound layers with a part of a rubber material of said circumferential covering portion impregnated into said compound layers.

2. The metal annular gasket as set forth in claim 1, wherein:
said compound layers have a compressed flat layer portion with a fixed thickness whose inner surfaces are compressed in their thickness direction, whereas said annular seal layer has a covering layer portion which extends from said circumferential covering portion and is integrally formed on the surface of said compressed flat layer portion in a manner that the surfaces of said covering layer portion are connected to the surfaces of said compound layers except for said compressed flat layer portion for providing smooth transition in their thickness direction.

3. The metal annular gasket as set forth in claim 2, wherein:
an annular bead portion with a chevron shape is concentrically provided on the surface of said annular seal layer in a thickness direction of said annular seal layer.

4. The metal annular gasket as set forth in claim 1 wherein:
an annular bead portion with a chevron shape is concentrically provided on the surface of said annular seal layer in a thickness direction side of said annular seal layer.

\* \* \* \* \*